(12) United States Patent
Nobayashi

(10) Patent No.: US 8,994,769 B2
(45) Date of Patent: Mar. 31, 2015

(54) OPTICAL WRITING HEAD AND IMAGE FORMING APPARATUS

(75) Inventor: Kazuya Nobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 13/346,994

(22) Filed: Jan. 10, 2012

(65) Prior Publication Data

US 2012/0182371 A1    Jul. 19, 2012

(30) Foreign Application Priority Data

Jan. 14, 2011   (JP) ................................. 2011-005818

(51) Int. Cl.

| | |
|---|---|
| *B41J 2/385* | (2006.01) |
| *B41J 15/14* | (2006.01) |
| *B41J 27/00* | (2006.01) |
| *G02B 5/18* | (2006.01) |
| *G02B 27/42* | (2006.01) |
| *B41J 2/45* | (2006.01) |
| *G02B 27/00* | (2006.01) |
| *B41J 2/47* | (2006.01) |

(52) U.S. Cl.
CPC ............. *G02B 27/4211* (2013.01); *B41J 2/451* (2013.01); *G02B 27/0056* (2013.01); *G02B 27/0043* (2013.01); *B41J 2/47* (2013.01); *G02B 27/4227* (2013.01)
USPC .......................................................... 347/244

(58) Field of Classification Search
CPC ........ B41J 2/451; B41J 2/47; G02B 27/0043; G02B 27/0056; G02B 27/4211; G02B 27/4227
USPC ............................ 347/137, 244, 258; 359/558
See application file for complete search history.

(56) References Cited

U.S. PATENT DOCUMENTS

| | | | |
|---|---|---|---|
| 5,914,814 A * | 6/1999 | Ang | 359/565 |
| 2009/0086328 A1 | 4/2009 | Sowa | |
| 2010/0321658 A1* | 12/2010 | Sowa et al. | 355/55 |
| 2011/0090297 A1* | 4/2011 | Arai et al. | 347/224 |
| 2011/0205606 A1* | 8/2011 | Minabe et al. | 359/12 |

FOREIGN PATENT DOCUMENTS

JP    H06-167659 A    6/1994

* cited by examiner

*Primary Examiner* — Justin Seo
*Assistant Examiner* — Kendrick Liu
(74) *Attorney, Agent, or Firm* — Canon USA, Inc. IP Division

(57) ABSTRACT

An optical writing head allows the formation of a light collective spot with a small diameter and the acquisition of a deep focal depth to go together. An optical writing head includes a light emitting element array in which a plurality of light emitting elements is arranged, and a lens system including a lens array configured to concentrate luminous flux radiated from the light emitting element to a predetermined image plane, in which the lens system is telecentric on the image side and satisfies the following conditional expression, where a wavelength at which luminous flux radiated from the light emitting element has a peak light intensity is $\lambda_0$, axial chromatic aberration of a wavelength having a light intensity approximately 0.81 times the peak light intensity is $\Delta_{sk}$, and the numerical aperture of the lens system on the image side is NA.

$$\Delta_{sk} > \frac{\lambda_0}{2} \frac{1}{NA(\lambda_0)^2}$$

11 Claims, 16 Drawing Sheets

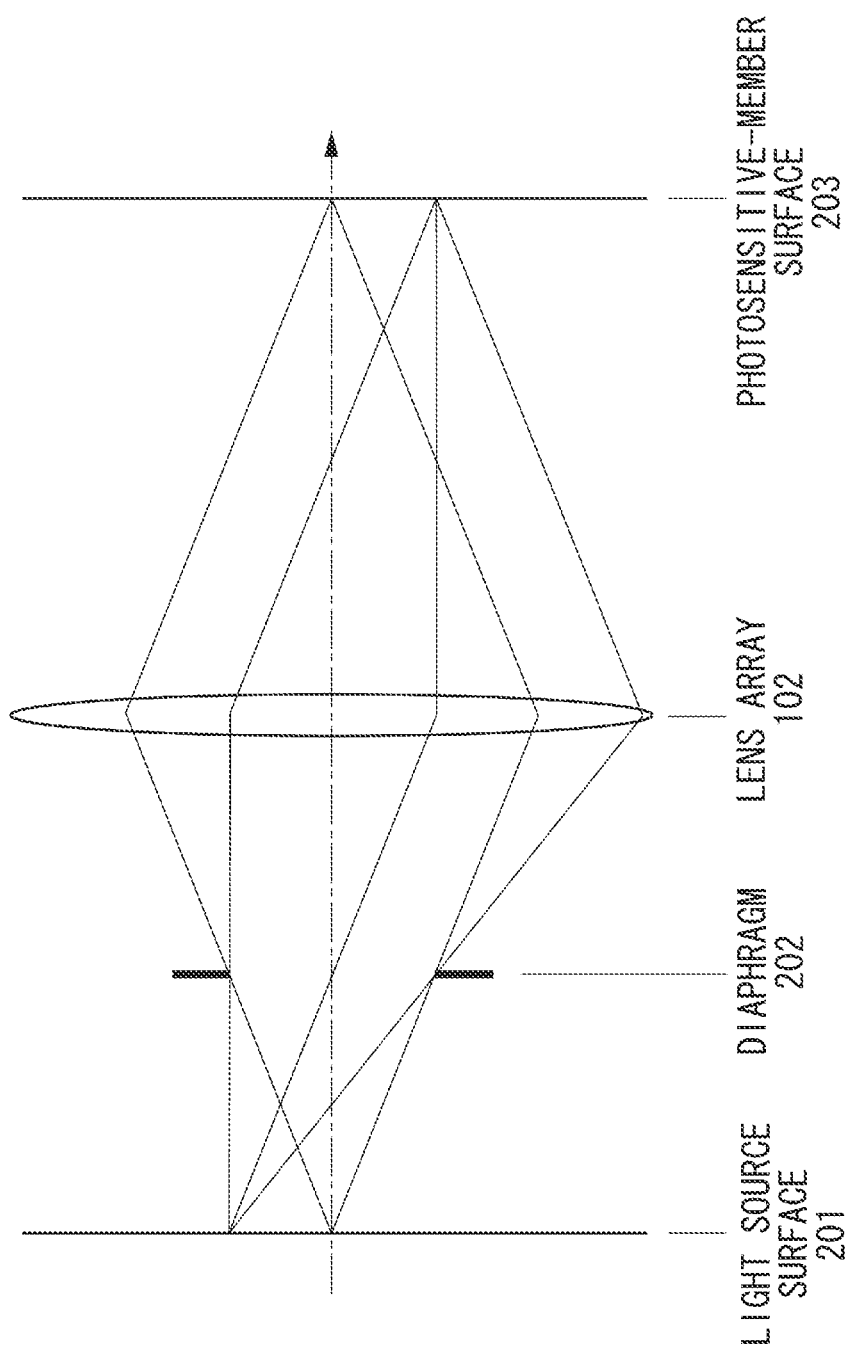

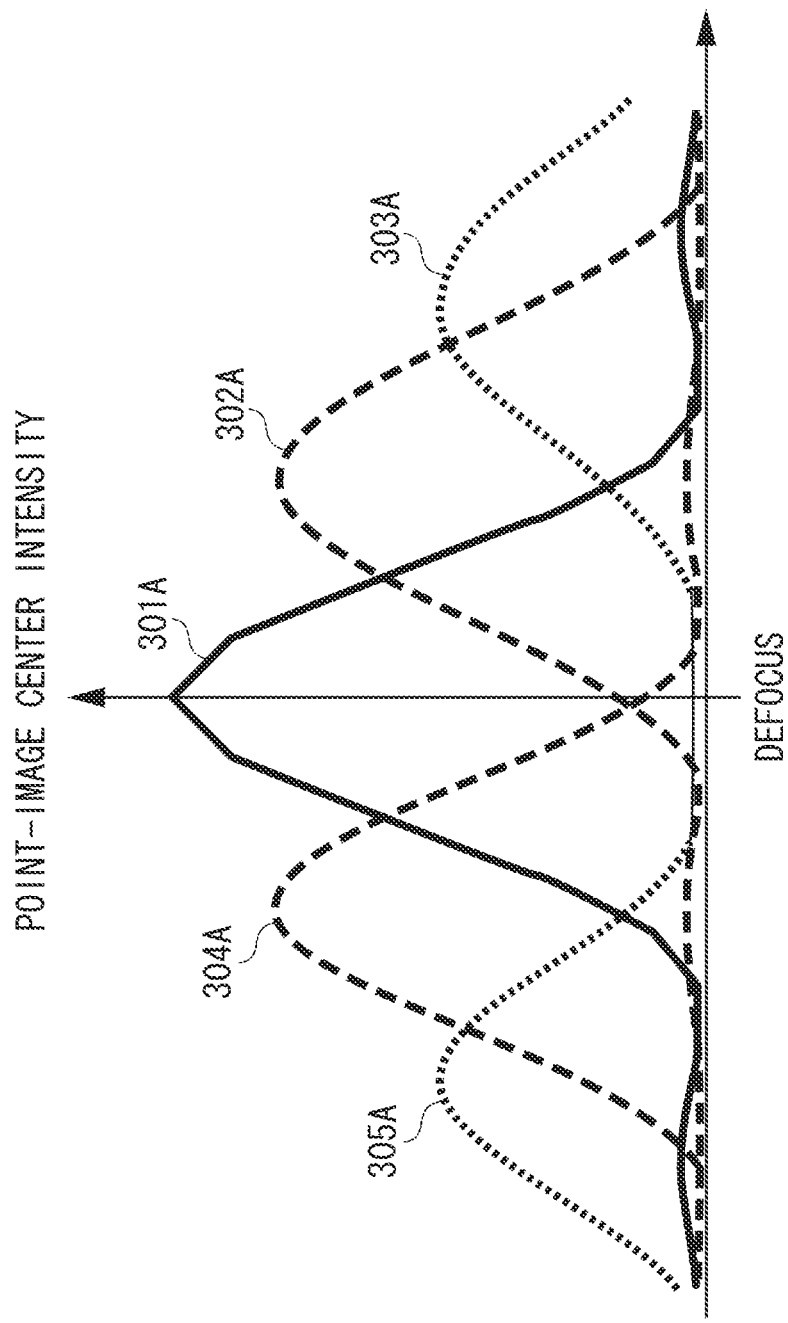

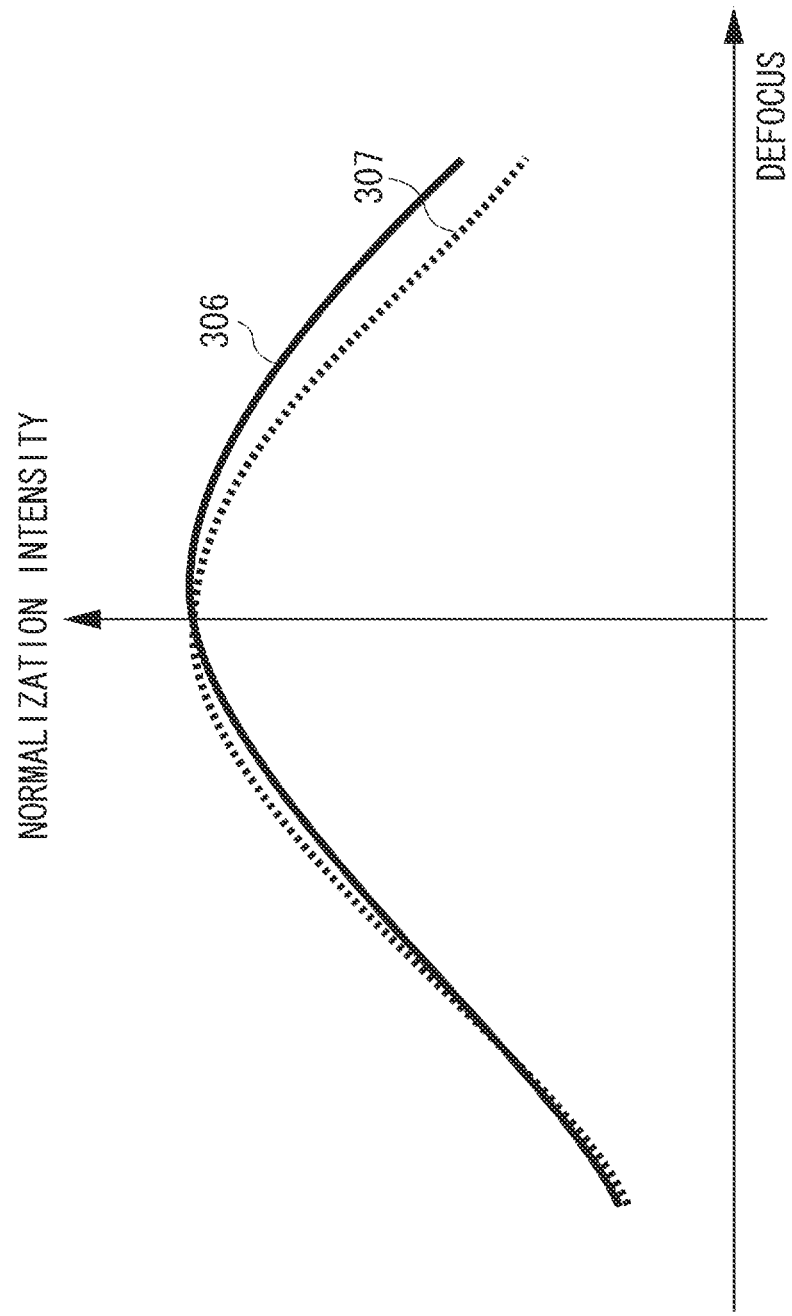

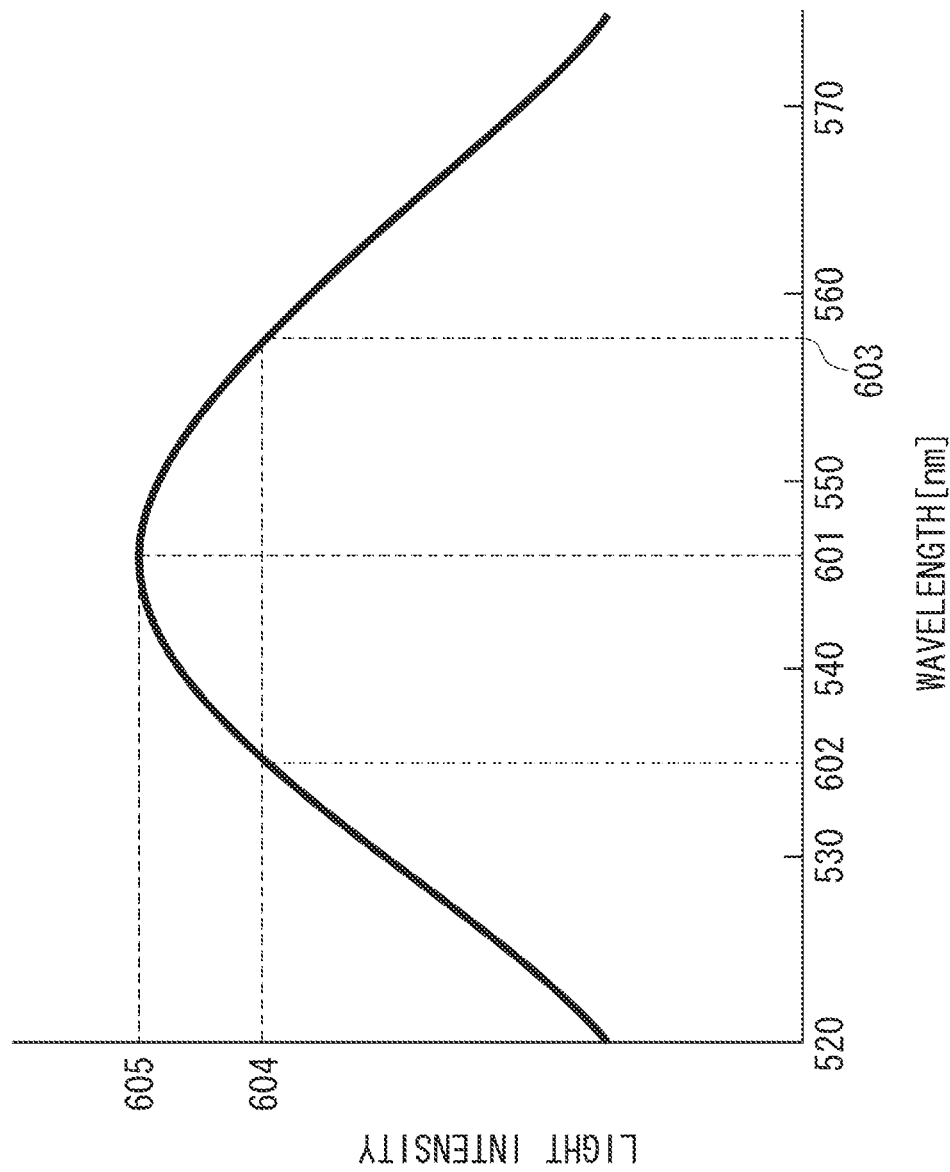

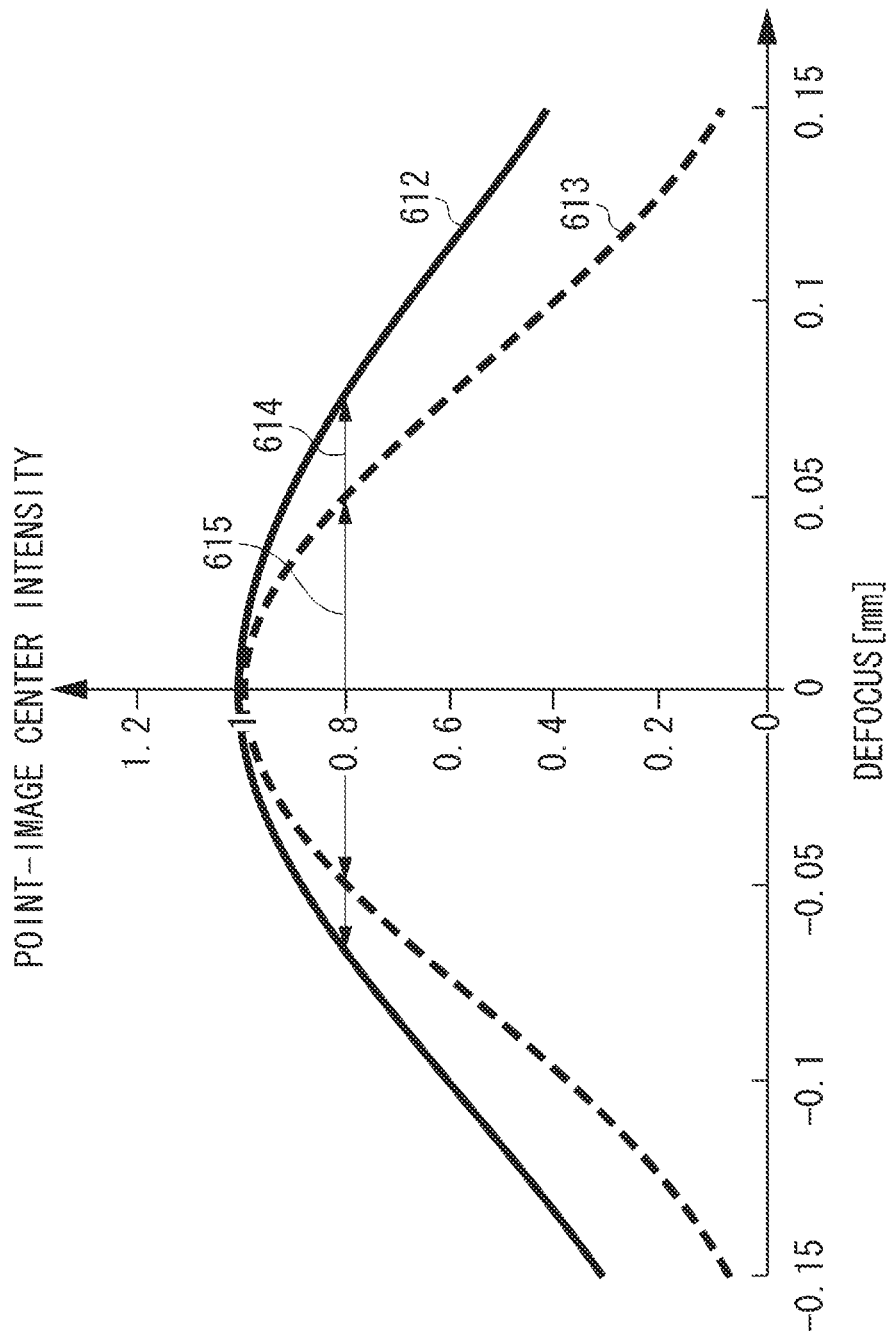

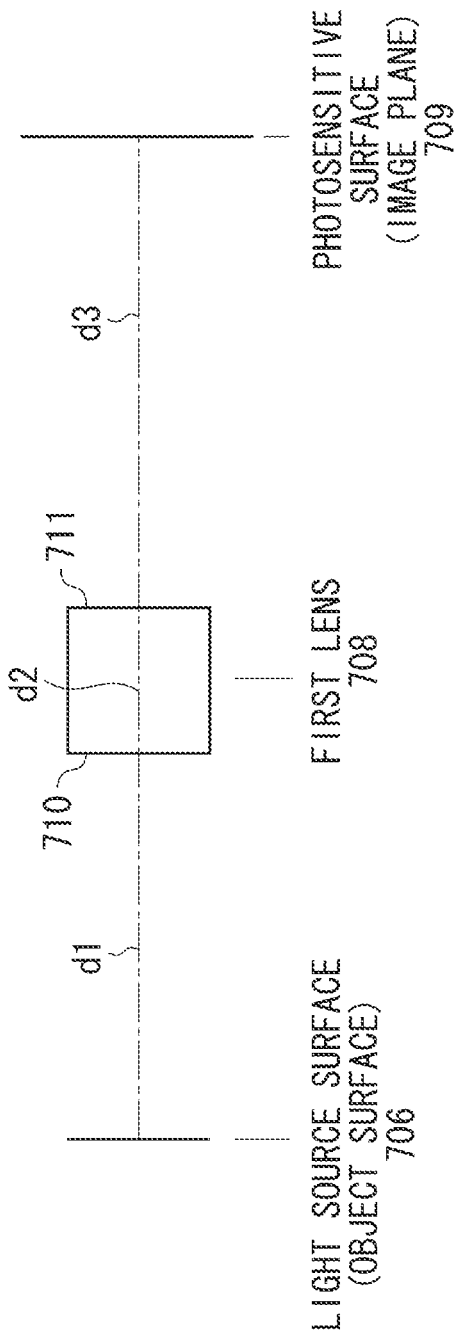

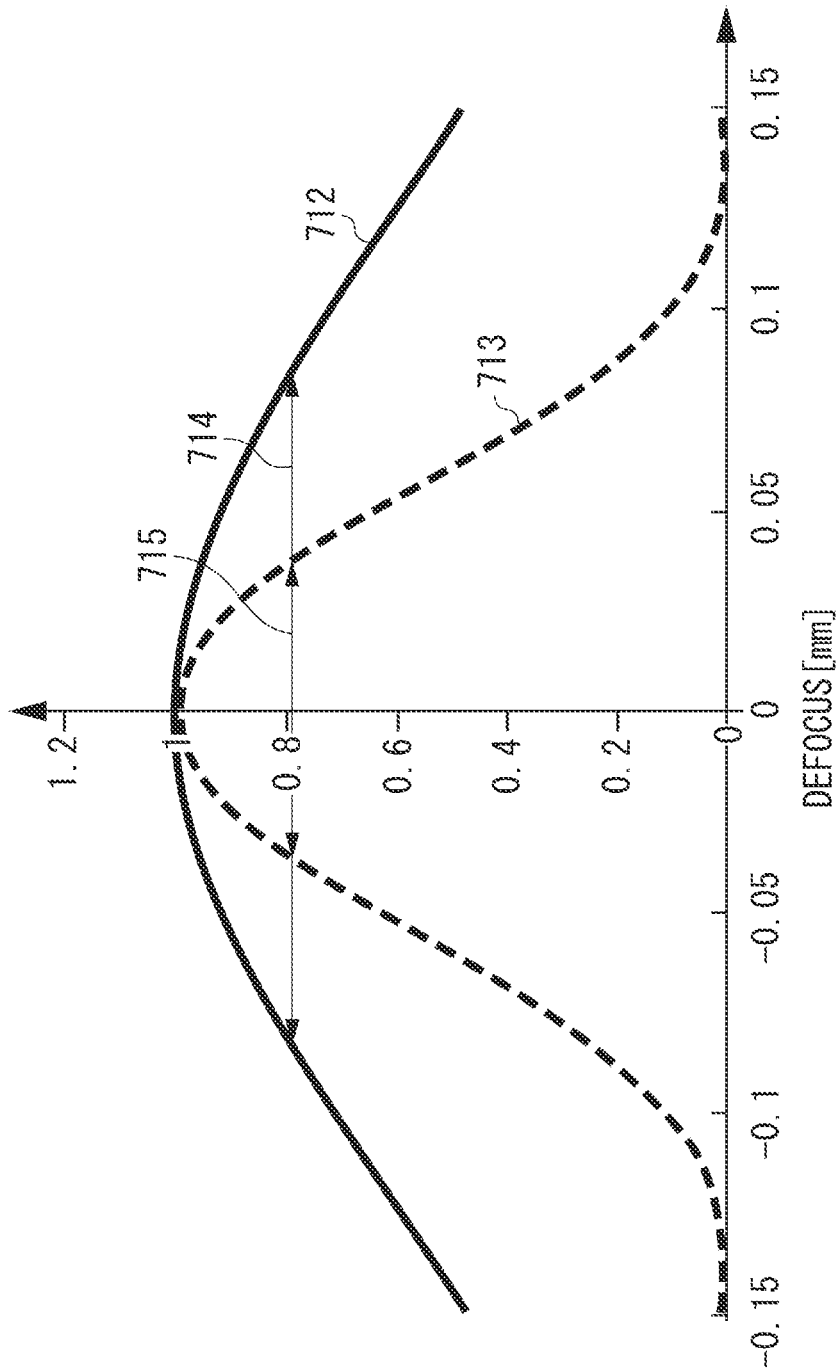

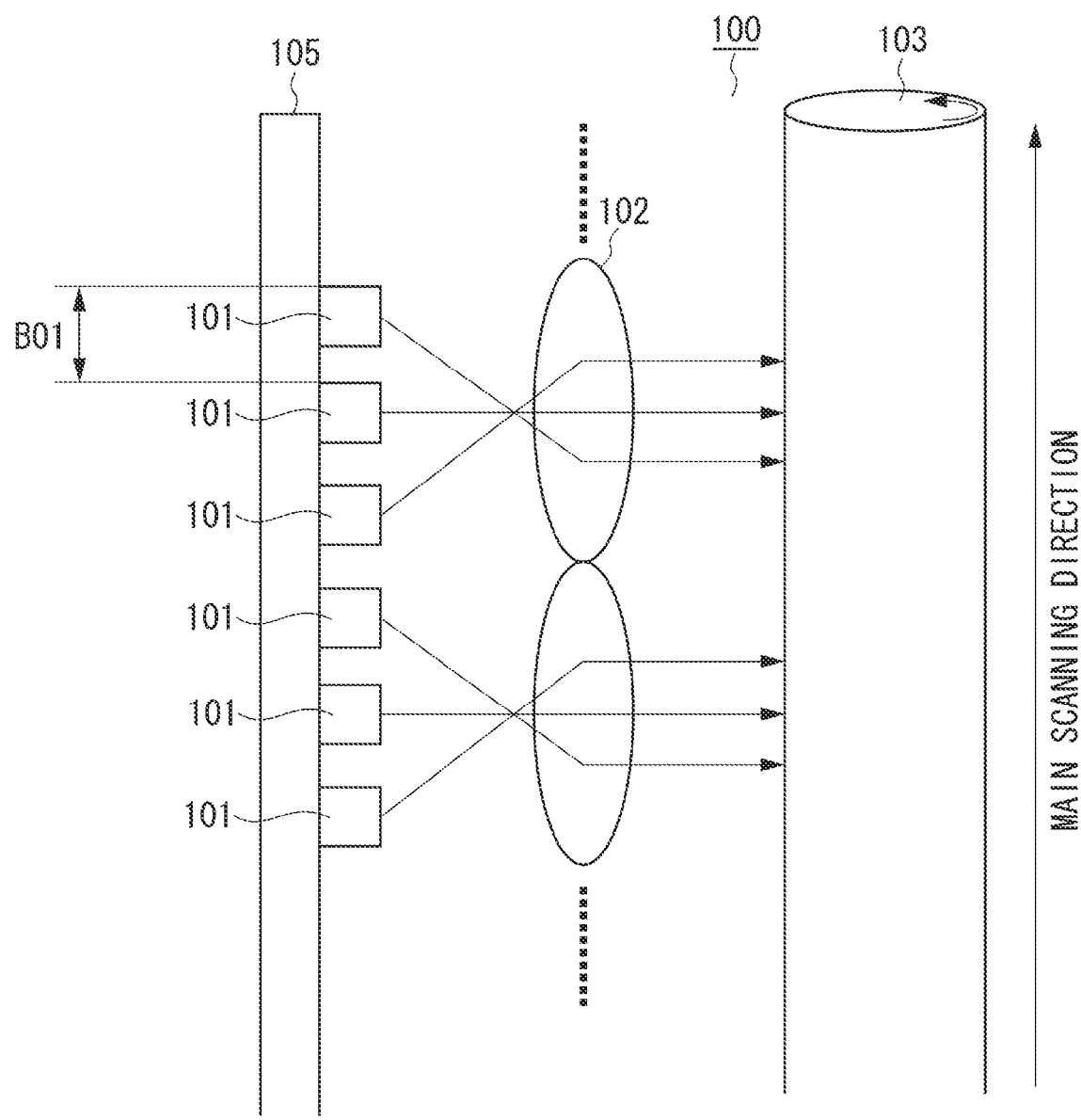

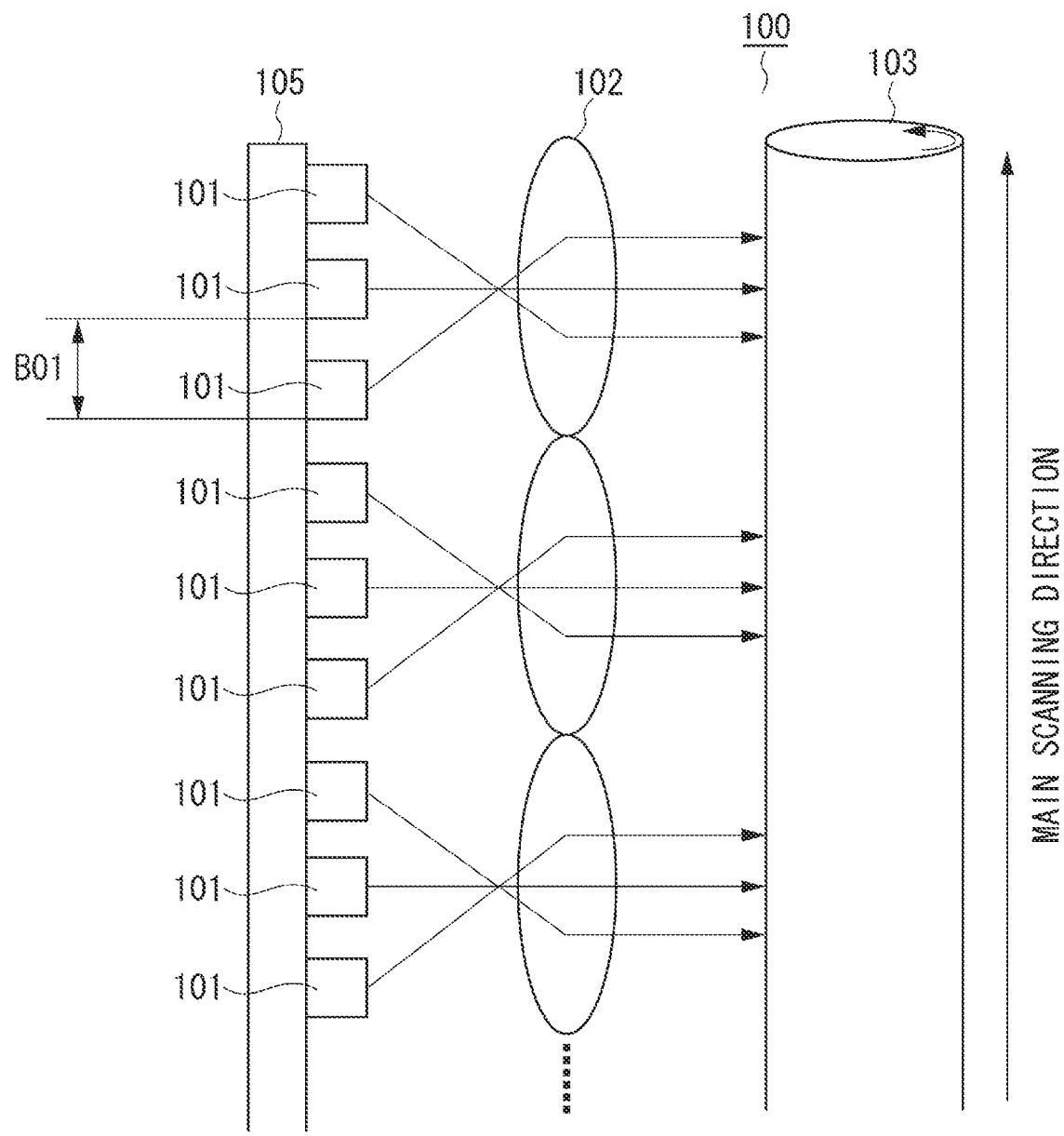

OPTICAL WRITING HEAD AND IMAGE FORMING APPARATUS

BACKGROUND OF THE INVENTION

1. Field of the Invention

Embodiments of the present invention relate to an optical writing head and an image forming apparatus and, in particular, to an optical writing head which is used for an electrophotographic copying machine, a printer, and a facsimile machine and forms an imaging spot by a lens array projecting beams from a plurality of light emitting elements onto a light receiving surface and an image forming apparatus using the optical writing head.

2. Description of the Related Art

Until now, an optical writing head used for electrophotographic copying machine and other devices includes a light emitting element array in which a plurality of light emitting elements such as a light emitting diode (LED) is arranged, and a lens array in which a plurality of lenses is arranged in parallel between photosensitive drums which are image carriers.

Luminous flux modulated according to an image signal is emitted from a light emitting element and concentrated by the lens array at the surface of the photosensitive drum in a spot shape to record an image.

Such an optical writing head is required to perform higher-definition printing.

The photosensitive drum is cylindrical and is rotated around the axis of the cylinder as a rotation axis. The rotation axis deviates from the center axis of the photosensitive drum due to a production error and an installation error at the time of assembly.

For this reason, an image plane moves back and forth in the optical-axis direction according to the rotation of the photosensitive drum. As a result, a spot position and a spot diameter formed on the surface of the photosensitive drum are varied according to the rotation of the photosensitive drum, which produces uneven density and color change on the recorded image.

Hitherto, U.S. Patent Application Publication US2009/0086328A1 discusses a unit capable of reducing a change in a spot position caused by an image plane moving back and forth in the optical-axis direction by making an image side of a lens array telecentric. According to such a configuration, a principal ray is parallel to the optical axis, so that a change in a spot position is smaller even if the image plane moves back and forth and a change in a spot diameter may be reduced within the focal depth of the lens array.

In order for a conventional method to perform a higher-definition printing, it is required to increase the numerical aperture on the image side (image-side NA) and form a light collective spot to be small in diameter on the surface of a photosensitive drum.

On the other hand, the increase of the image-side NA of the lens array decreases the focal depth of the lens array, which narrows the tolerance of a change in position of the image plane.

Thus, in order to perform a higher-definition printing, the photosensitive drum needs to be accurately installed at the time of production and assembly. This increases the cost of an optical writing head and a photosensitive drum.

Accordingly, the above situation demands an optical writing head in which a light collective spot of a small diameter and a deep focal depth go together.

SUMMARY OF THE INVENTION

One disclosed aspect of the embodiments provides an optical writing head and an image forming apparatus in which the formation of a light collective spot of a small diameter and the acquisition of a deep focal depth go together.

According to an aspect of the embodiments, an optical writing head includes a light emitting element array in which a plurality of light emitting elements is arranged, and a lens system including a lens array configured to concentrate luminous flux radiated from the light emitting element to a predetermined image plane, in which the lens system is telecentric on the image side and satisfies the following conditional expression where a wavelength at which luminous flux radiated from the light emitting element has a peak light intensity is $\lambda_0$, axial chromatic aberration of a wavelength having a light intensity approximately 0.81 times the peak light intensity is $\Delta_{sk}$, and the numerical aperture of the lens system on the image side is NA.

$$\Delta_{sk} > \frac{\lambda_0}{2} \frac{1}{NA(\lambda_0)^2}$$

According to another aspect of the embodiments, an image forming apparatus includes the above optical writing head and a photosensitive portion which the optical writing head irradiates with light to form a latent image thereon.

One disclosed aspect of the embodiments provides an optical writing head and an image forming apparatus which allow satisfying both of the formation of a light collective spot small in diameter and the acquisition of a deep focal depth.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the embodiments and, together with the description, serve to explain the principles of the embodiments.

FIG. 2 is a schematic cross sectional view illustrating a configuration of a part of the optical writing head according to an exemplary embodiment.

FIGS. 3A, 3B, and 3C are charts describing the principle of the optical writing head according to an exemplary embodiment.

FIGS. 6A, 6B, and 6C are charts describing an example of a configuration of the optical writing head according to the first exemplary embodiment.

FIGS. 7A, 7B, and 7C are charts describing an example of a configuration of the optical writing head according to the second exemplary embodiment.

FIGS. 8A, 8B, and 8C are charts describing the optical writing head using an optical system according to the second exemplary embodiment.

DESCRIPTION OF THE EMBODIMENTS

Various exemplary embodiments, features, and aspects of the embodiments will be described in detail below with reference to the drawings.

The configuration of an optical writing head according to an exemplary embodiment is described below with reference to FIG. 1.

Figure 1:
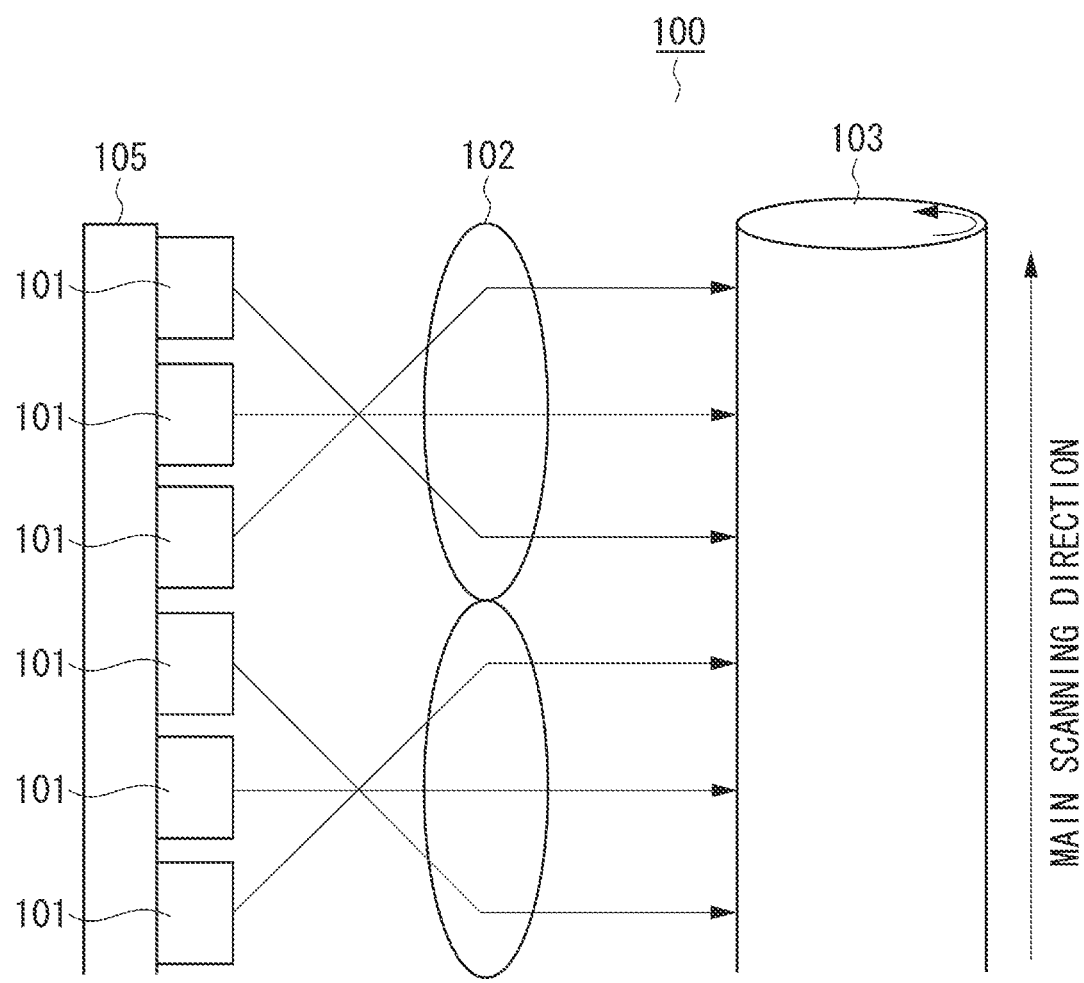
FIG. 1 is a schematic cross sectional view illustrating a configuration of an optical writing head according to an exemplary embodiment.

FIG. 1 is a schematic cross sectional view of an optical writing head 100 taken along a plane parallel to the main scanning direction. In FIG. 1, a light emitting element 101 is arranged on a substrate 105. A plurality of the light emitting elements 101 is arranged on a substrate to form a light emitting element array. The light emitting element 101 may be composed of a light emitting diode (LED) or an organic electroluminescence display (EL), for example. A lens array 102 includes a plurality of lens arranged in parallel and concentrates luminous flux radiated from the light emitting element onto a predetermined image plane.

Luminous flux radiated from the light emitting element 101 is concentrated by the lens array 102 to form a spot on the surface of the photosensitive drum 103.

The lens array 102 has an image-side telecentric configuration in which a principal ray is parallel to an optical axis on the image side. For example, FIG. 2 illustrates a schematic diagram of a part of an optical writing head 100.

In FIG. 2, the light emitting elements 101 are arranged in an array shape on a light source surface (object surface) 201.

A diaphragm plate 202 and the lens array 102 are disposed between the light source surface 201 and a photosensitive-member surface (image plane) 203. A distance between the diaphragm 202 and the object-side principal point of the lens array 102 is taken as a focal length of the lens array 102. Such an arrangement makes the lens array 102 image-side telecentric. A light emission spectrum radiated from the light emitting element 101 has a finite wave length width.

Figure 3A:
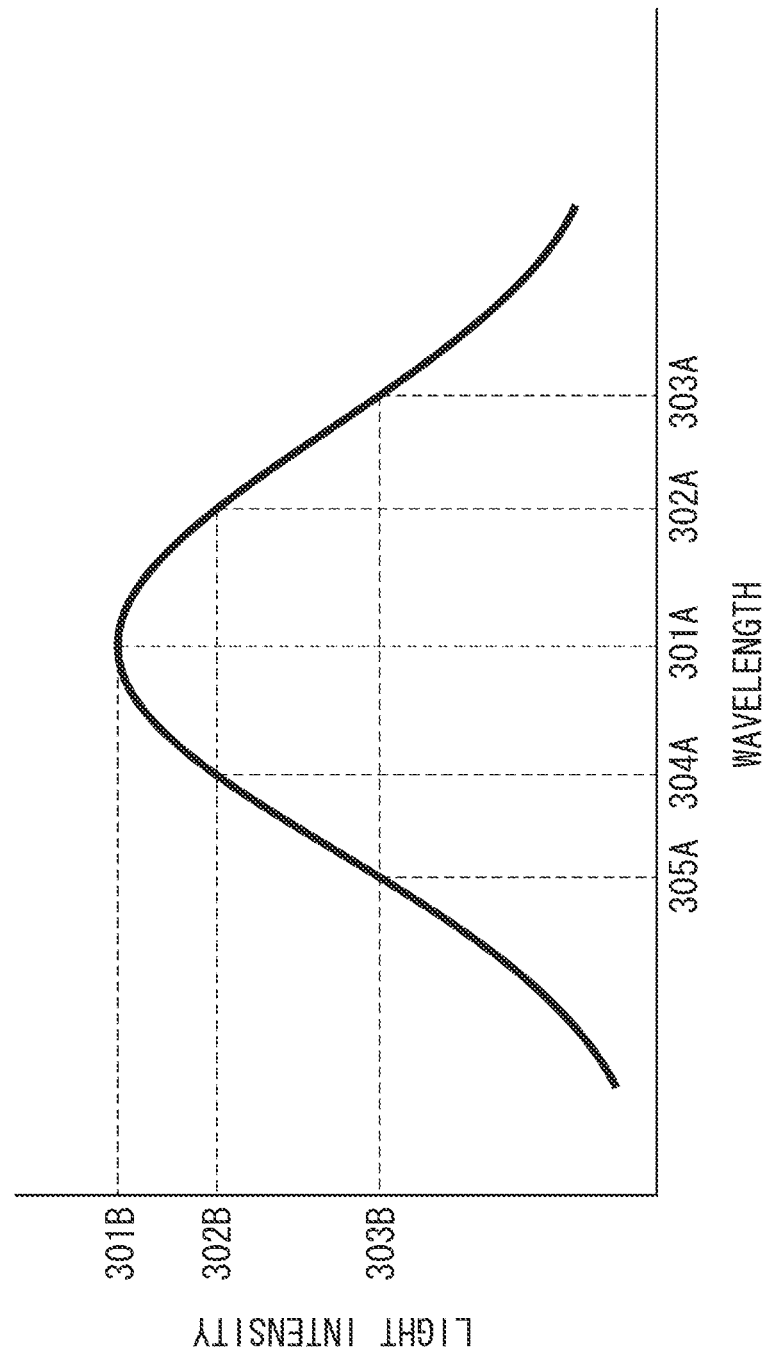

The principle of the optical writing head according to the exemplary embodiment is described below with reference to FIGS. 3A, 3B, and 3C. FIG. 3A illustrates an example of a light emission spectrum of the light emitting element 101. In FIG. 3A, the abscissa is wavelength and the ordinate is light intensity.

The light emitting element 101 has a light intensity 301B at a wavelength 301A, a light intensity 302B at wavelengths 302A and 304A, and a light intensity 303B at wavelengths 303A and 305A.

When the light radiated from the light emitting element 101 is concentrated by the lens array 102, images are formed at different positions for each wavelength due to axial chromatic aberration.

FIG. 3B is a chart illustrating the center intensity of point images (point-image center intensity) of the wavelengths 301A to 305A at each defocus position.

In FIG. 3B, the abscissa represents defocus with a paraxial image plane of the wavelength 301A as a reference and the ordinate represents a point-image center intensity at each defocus position.

The point images of each wavelength have the maximum intensity at different defocus positions due to axial chromatic aberration. The light emitting element 101 emits light including a plurality of wavelengths in addition to the wavelengths 301A to 305A. For this reason, the point-image center intensity of the light emitting element 101 may be represented by integrating the point image of each wavelength.

A solid line 306 in FIG. 3C indicates the point-image center intensity of the light emitting element 101 obtained by integrating the point image of each wavelength. A dotted line 307 in FIG. 3C indicates the maximum intensity of the point image of each wavelength.

In FIG. 3C, the abscissa represents defocus with a paraxial image plane of the wavelength 301A as a reference and the ordinate represents the intensity normalized at a defocus=0 for the purpose of comparison.

From FIG. 3C, it may be seen that the solid line 306 and the dotted line 307 show almost equal defocus characteristics.

Therefore, a change in the center intensity of point image of the light emitting element 101 per unit defocus may be represented by a change in the maximum intensity of point image of each wavelength per unit defocus.

The smaller a change in the center intensity of point image per unit defocus, the smaller a change in spot diameter at each defocus position and the deeper the focal depth.

The center intensity of point image of the light emitting element 101 has the defocus characteristic which is almost equal to the maximum intensity of point image of each wavelength, so that the axial chromatic aberration of the lens array 102 is increased to reduce a change in the center intensity of point image per unit defocus and deepen the focal depth.

Thereby, the focal depth may be deepened without reducing the image-side NA of the lens array 102, so that the small spot diameter and the deep focal depth may go together.

Next, a range is described below which has a great effect in deepening the focal depth.

Figure 4:
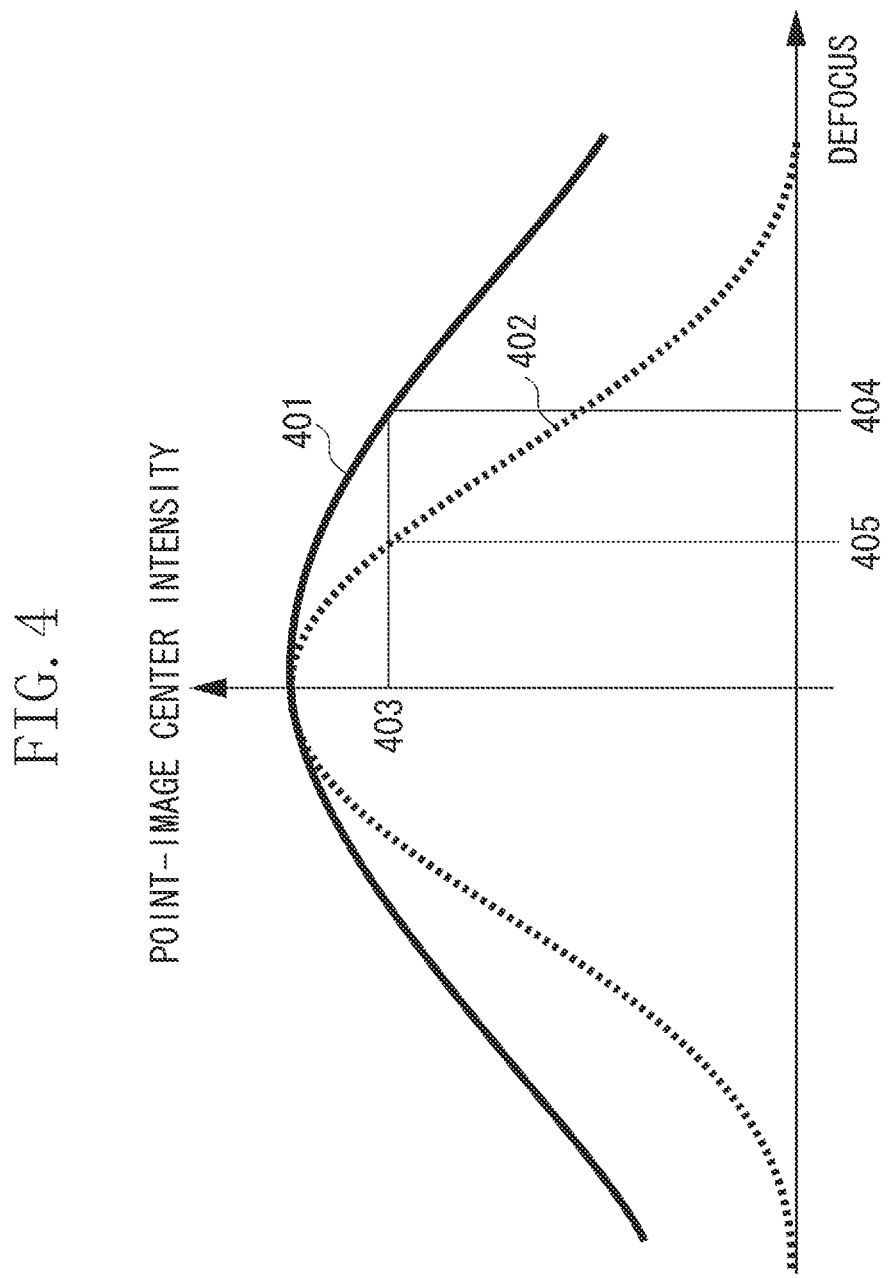
FIG. 4 is a chart illustrating the center intensity of a point image of the light emitting element and the center intensity of a point image at a peak wavelength of the light emitting element to describe the effect of the optical writing head according to an exemplary embodiment.

FIG. 4 illustrates the center intensity of point image of the light emitting element 101 and the center intensity of point image at a peak wavelength λ0 at which the luminous flux emitted from the light emitting element 101 has a peak light intensity.

In FIG. 4, the abscissa represents defocus with a paraxial image plane of the peak wavelength λ0 of the light emitting element 101 as a reference and the ordinate represents the intensity normalized at a defocus=0.

A solid line 401 in FIG. 4 indicates the point-image center intensity of the light emitting element 101. A dotted line 402 in FIG. 4 indicates the point-image center intensity at the peak wavelength λ0.

In FIG. 4, reference numeral 403 denotes the point-image center intensity which is approximately 0.81 times a point-image center intensity at a defocus=0.

At a defocus 404, the solid line 401 assumes the point-image center intensity 403. At a defocus 405, the dotted line 402 assumes the point-image center intensity 403.

It is generally said that a change in an image of an optical system is small in an area where the point-image center intensity is approximately 0.81 times or less a point-image center intensity at a defocus=0. Therefore, focal depth may be represented by defocus with the point-image center intensity 403.

In other words, the defocus 405 represents the focal depth of the lens array 102 determined by the image-side numerical aperture NA. The defocus 404 represents the focal depth of the optical writing head 100 according to one disclosed aspect of the embodiments.

If the defocus 405 is taken as $z_0$, $z_0$ is represented by the following conditional expression 1. In the expression 1, NA refers to the image-side numerical aperture of the lens array 102.

$$z_0 = \frac{\lambda_0}{2} \frac{1}{NA^2} \qquad \text{Expression 1}$$

The defocus 404 assumes axial chromatic aberration Δsk of a wavelength having a light intensity which is approximately 0.81 times peak light intensity with a light emission spectrum of the light emitting element 101.

If the defocus position $\Delta_{sk}$ of the solid line 401 has a value greater than the defocus position $\Delta_0$ of the dotted line 402, the focal depth may be deepened irrespective of the image-side NA of the lens array 102.

Therefore, the focal depth may be deepened irrespective of the image-side NA of the lens array 102 by satisfying the following conditional expression 2. Thereby, the small spot diameter and the deep focal depth may go together.

$$\Delta_{sk} > \frac{\lambda_0}{2} \frac{1}{NA(\lambda_0)^2} \qquad \text{Expression 2}$$

Figure 5:
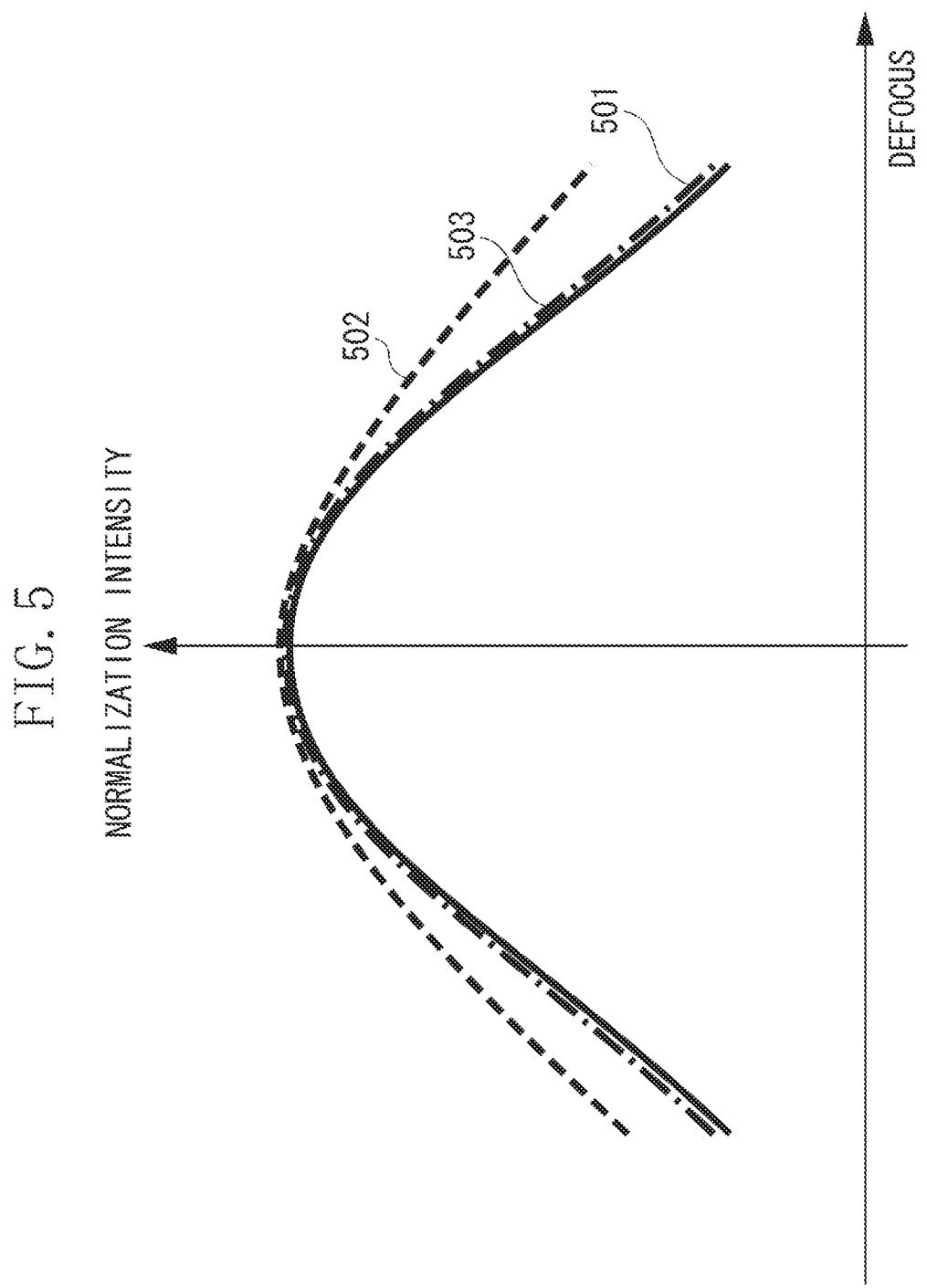
FIG. 5 is a chart describing the effect of the optical writing head according to an exemplary embodiment.

In FIG. 5, the point-image center intensity of the peak wavelength of the light emitting element 101 is represented by a solid line 501. The point-image center intensity of the light emitting element 101 when the conditional expression 2 is satisfied is represented by a dotted line 502. The point-image center intensity of the light emitting element 101 obtained when equality sign is had in the conditional expression 2 is represented by an alternate long and short dash line 503.

In FIG. 5, the ordinate and the abscissa are similar to those in FIG. 4.

The alternate long and short dash line 503 draws a similar curve as the solid line 501 and an effect of deepening the focal depth is small.

On the other hand, with respect to the dotted line 502, a change in the point-image center intensity per unit defocus is smaller than the solid line 501, which enables deepening of the focal depth.

As described above, the focal depth may be made deeper than that determined by the image-side NA of the lens array 102 by satisfying the conditional expression 2.

According to one disclosed aspect of the embodiments, the image-side telecentric is not limited to a case where the principal ray incident on the image plane is completely parallel to an optical axis. The image-side telecentric includes the case where an angle made by the optical axis and the principal ray incident on the photosensitive drum 103 which is the image plane, is within ±1%.

In one disclosed aspect of the embodiments, an image forming apparatus may be formed such that a photosensitive portion is irradiated with light from the optical writing head to form a latent image using the optical writing head.

An exemplary embodiment is described below.

An example of an optical writing head to which one disclosed aspect of the embodiments is applied is described as a first exemplary embodiment. FIG. 6A is a graph illustrating the light emission spectrum of the light emitting element 101. The abscissa is wavelength and the ordinate is light intensity.

The light emitting element 101 has the light emission spectrum with a full width at half maximum of 40 nm.

A wavelength 601 is a peak wavelength $\lambda_0$ of the light emitting element 101 and $\lambda_0$=546 μm in the present exemplary embodiment.

Figure 6B:
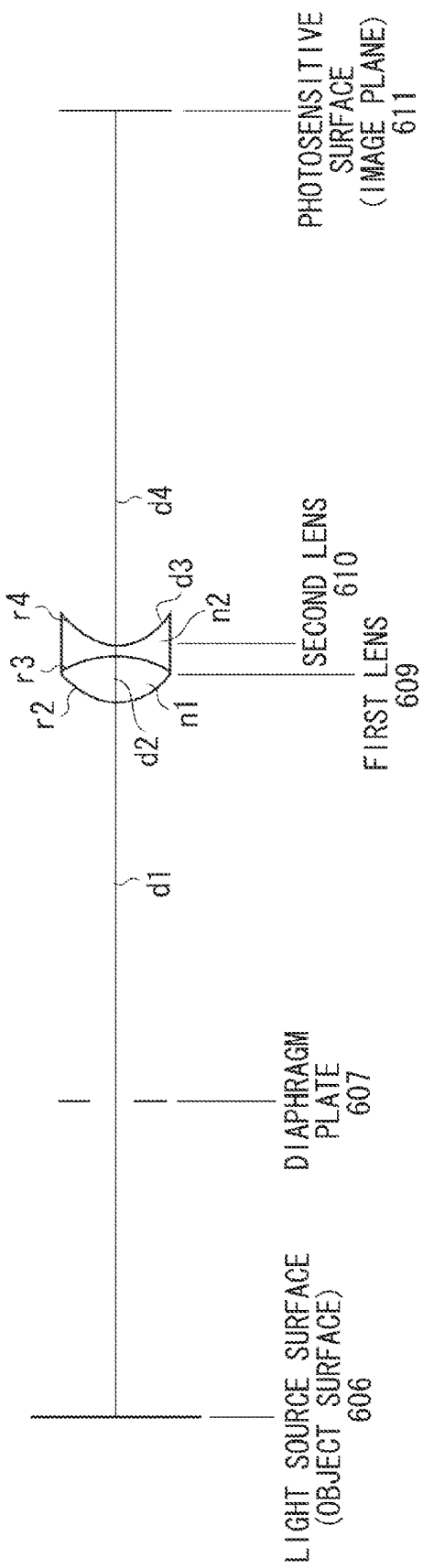

Wave lengths 602 and 603 are wavelengths $\lambda_1$ and $\lambda_2$ with a light intensity 604 which is approximately 0.81 times a peak intensity 605. The wavelength $\lambda_1$=535 nm and the wavelength $\lambda_2$=558 nm. FIG. 6B illustrates a main scanning cross section of the optical system corresponding to a single lens array 102 according to the first exemplary embodiment including a doublet lens comprised of a first lens which is a crown lens and a second lens which is a flint lens. A diaphragm plate 607 is arranged at a focus of a combination lens system made of the first and second lenses on the object side to make the image side telecentric.

According to the present exemplary embodiment, an axial chromatic aberration $\lambda_{sk}$=−0.0536 mm at the wavelength $\lambda_1$, and an axial chromatic aberration $\Delta_{sk}$=0.0540 mm at the wavelength $\lambda_2$. The right side member of the conditional expression 2 is 0.0486 mm using the aperture angle on the image side and the peak wavelength, which satisfies the conditional expression 2.

FIG. 6C illustrates a point-image center intensity and a defocus characteristic in the present exemplary embodiment. The abscissa represents defocus with a paraxial image plane of the wavelength $\Delta_0$ as a reference and the ordinate represents the point-image center intensity. A solid line 612 illustrates a point-image center intensity in the present exemplary embodiment. A dotted line 613 illustrates a point-image center intensity at the wavelength $\lambda_0$.

From FIG. 6C, it may be seen that in the solid line 612 a change in the point-image center intensity per unit defocus is smaller than the dotted line 613 and with the configuration of the present exemplary embodiment, a deep focal depth is acquired.

The spectrum width of a general LED is substantially 40 nm. For this reason, a difference between a wavelength with a light intensity approximately 0.81 times a peak light intensity, and a peak wavelength is substantially 10 nm. A conventional lens array uses a material whose Abbe number is great to lessen the influence of chromatic aberration.

If a resinous positive lens of polycarbonate whose refractive index dispersion is great (Abbe number is small) is used, the axial chromatic aberration thereof is as small as 0.03 mm to 0.04 mm, which is difficult to satisfy the conditional expression 2.

As described in the present exemplary embodiment, the doublet lens in which the crown lens and the flint lens with different refractive indexes are combined, is effective to acquire the axial chromatic aberration satisfying the conditional expression 2.

The numerical data of the present exemplary embodiment are shown below. In the order from a light source surface 606 to a photosensitive surface 611, r2, r3, . . . (mm) represent curvature radii of each optical surface, d1, d2, . . . (mm) represent distances between optical surfaces, and refractive indexes n1, n2, . . . represent each transparent medium.

The refractive index of each transparent medium is represented by using the dispersion formula of the following conditional expression 3.

$$n^2 = C_1 + C_2\lambda^2 + C_3\lambda^{-2} + C_4\lambda^{-4} + C_5\lambda^{-6} + C_6\lambda^{-8} \qquad \text{Expression 3}$$

The coefficients of the refractive indexes n1 and n2 have the following values.

n1: $C_1$=2.633127  $C_2$=−7.937823E-2  $C_3$=−1.734506E-1  $C_4$=8.609268E-2  $C_5$=−1.617892E-2  $C_6$=1.128933E-3
n2: $C_1$=2.399964  $C_2$=−8.308636E-2  $C_3$=−1.919569E-1  $C_4$=8.720608E-2  $C_5$=−1.666411E-2  $C_6$=1.169519E-3
r1=∞(object surface) d1=4
r2=0.39549 d2=0.25 n1
r3=−0.64735 d3=0.06 n2
r4=0.33311 d4=3
r5=∞(image plane)
Aperture angle on the object side (half angle)=0.075 rad
Aperture angle on the image side (half angle)=0.075 rad
Lateral magnification=−1.0

A second exemplary embodiment is different from the first exemplary embodiment in that a plane with a positive power is formed by a diffractive optical element (DOE).

A power $\phi_1$ of the DOE at the wavelength $\lambda_1$ may be expressed by the following equation when power is $\phi_0$ at a wavelength $\lambda_0$:

$$(\phi_1=(\lambda_1/\lambda_0)\times\phi_0,$$

and a change in power per unit wavelength is great. This provides a great axial chromatic aberration.

Figure 7A:
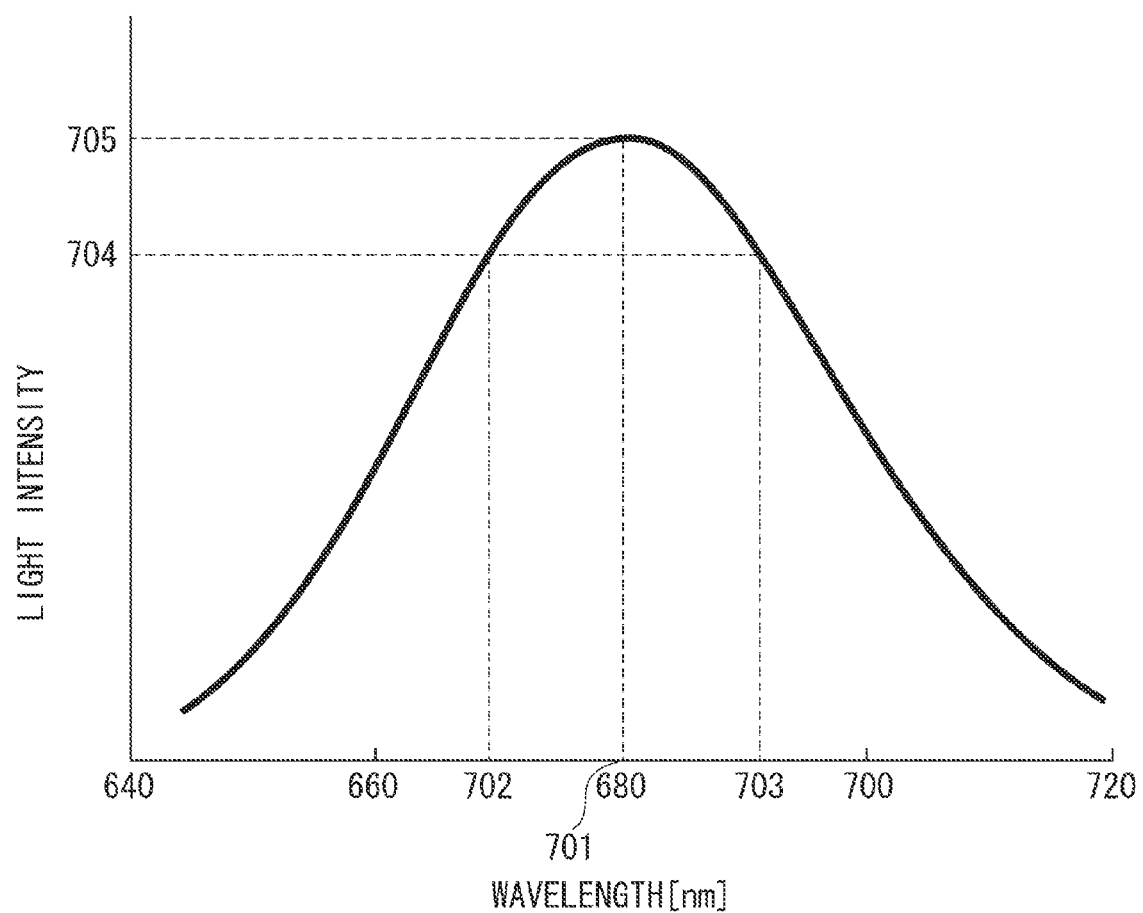

FIG. 7A is a graph illustrating the light emission spectrum of the light emitting element 101. The abscissa is wavelength and the ordinate is light intensity.

The light emitting element 101 has the light emission spectrum with a full width at half maximum of 40 nm. A wavelength 701 is a peak wavelength $\lambda_0$ of the light emitting element 101 and $\lambda_0=680$ μm in the present exemplary embodiment.

Wave lengths 702 and 703 are wavelengths $\lambda_1$ and $\lambda_2$ with a light intensity 704 approximately 0.81 times a peak intensity 705. The wavelength $\lambda_1=669$ nm and the wavelength $\lambda_2=691$ nm. FIG. 7B illustrates a main scanning cross section of the optical system corresponding to a single lens array 102 according to the second exemplary embodiment.

A first lens is formed of the DOE including a front side face 710 and a rear side face 711. A light source surface 706 is arranged at a focus of a front side lens of the first lens 708 on the object side.

A distance between the front side face 710 and the rear side face 711 of the first lens 708 is made equal to a value in which the sum of the focal lengths of the front side face 710 and the rear side face 711 is divided by the refractive index of the first lens so that the objet side and the image side are made telecentric.

The present exemplary embodiment has an axial chromatic aberration $\lambda_{sk}=0.0718$ mm at the wavelength $\lambda_1$ and an axial chromatic aberration $\Delta sk=-0.0718$ mm at the wavelength $\lambda_2$. The right side member of the conditional expression 3 is 0.034 mm using the aperture angle on the image side and the peak wavelength and satisfies the conditional expression 3.

FIG. 7C illustrates a point-image center intensity and a defocus characteristic in the present exemplary embodiment. The abscissa represents defocus with a paraxial image plane of the wavelength $\Delta_0$ as a reference and the ordinate represents the point-image center intensity.

A solid line 712 illustrates a point-image center intensity in the present exemplary embodiment. A dotted line 713 illustrates a point-image center intensity.

From FIG. 7C, it may be seen that a change in the point-image center intensity per unit defocus is smaller in the solid line 712 than the dotted line 713, and in the configuration of the present exemplary embodiment, a deep focal depth may be acquired. In the present exemplary embodiment, the DOE is used for the optical surface to generate a great axial chromatic aberration and acquire a deeper focal depth.

In the present exemplary embodiment, not only the image side but also the objet side are made telecentric. The objet side is also made telecentric to inhibit generation of the unevenness of the light amount and form a uniform latent image on a photosensitive member.

The lens array 102 in the present exemplary embodiment is an inverted magnifying optical system with a lateral magnification of −1.2 times. The absolute value of the lateral magnification is made greater than 1 to make the axial chromatic aberration greater and deepen the focal depth.

Figure 8A:
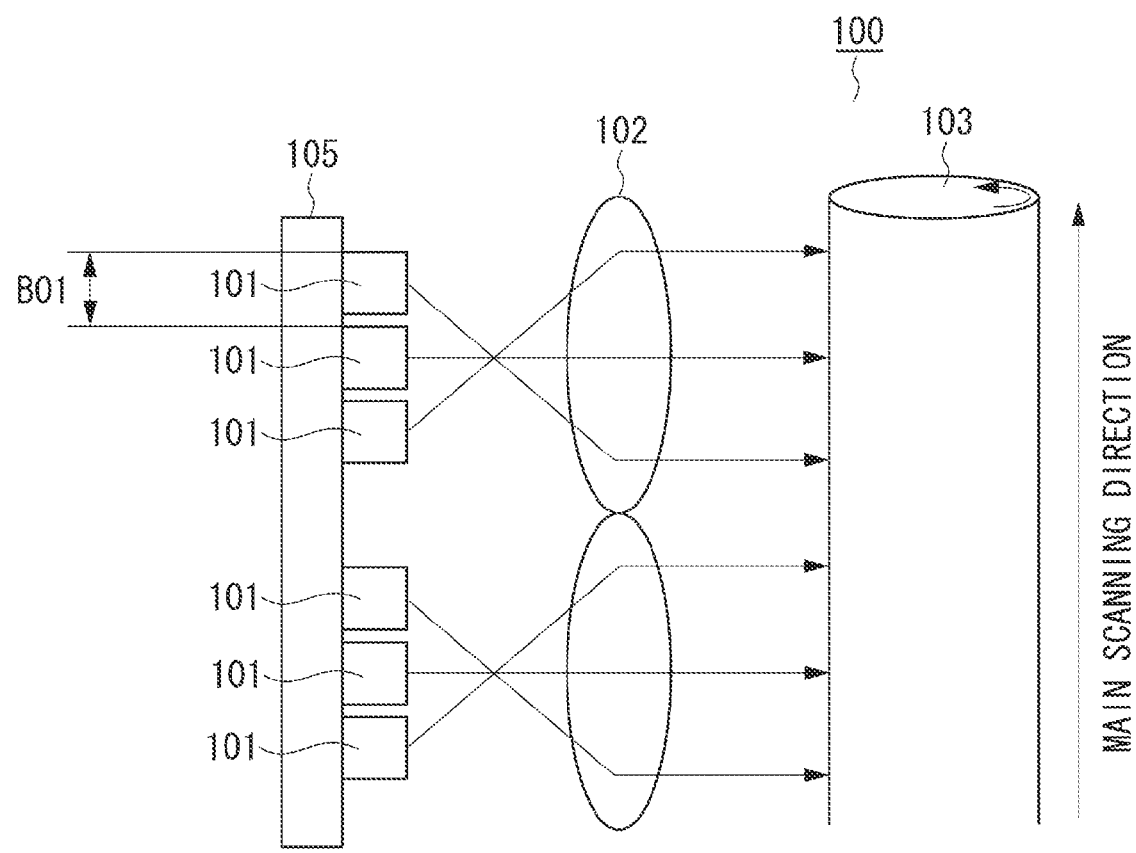

FIG. 8A illustrates a schematic diagram of the optical writing head 100 using a magnifying optical system. The arrangement of the light emitting element 101 is determined in consideration of the amount of magnification in which an interval 801 between the light emitting elements 101 is magnified by the magnification of the lens array 102, so that one column of images may be formed on the photosensitive drum 103.

In the present exemplary embodiment, the lens array 102 uses the inverted magnifying optical system, but may use an inverted reducing optical system.

FIGS. 8B and 8C illustrate schematic diagrams of the optical writing head 100 using a reducing optical system. In the optical writing head 100 illustrated in FIGS. 8B and 8C, a plurality of columns of the lens arrays 102 is arrayed also in the sub-scanning direction. FIGS. 8B and 8C illustrate schematic diagrams of columns different in the sub-scanning direction.

In such a configuration, the lens array 102 is shifted and arranged in parallel in the main scanning direction between columns different in the sub-scanning direction.

The light emitting element 101 is modified in synchronization with the rotation of the photosensitive drum 103 to form one column of images on the photosensitive drum 103.

In the reducing optical system, axial chromatic aberration is smaller than the magnifying optical system, however, the size of an image may be smaller than the magnifying optical system and a latent image with a small diameter may be formed on the photosensitive drum 103.

Although the emission angle of the light emitting element 101 is not limited in the present exemplary embodiment, the emission angle (half angle) of the light emitting element 101 is desirably 0.012 radian, which is equal to the aperture angle of the lens array 102 on the object side.

The emission angle of the light emitting element 101 is made equal to the aperture angle on the object side of the lens array 102 to eliminate the need for a diaphragm plate in the lens array 102 and light flux emitted from the light emitting element 101 may be efficiently guided to a photosensitive surface 709.

The numerical data of the present exemplary embodiment are shown below.

In the order from a light source surface 706 to a photosensitive surface 709, f1, f2, . . . represent focal lengths of each optical surface, d1, d2, . . . represent distances (mm) between optical surfaces, and refractive index n1 represents a transparent medium. The refractive index of each transparent medium is represented by using the dispersion formula of the conditional expression 3. Coefficients of the refractive index n1 have the following values.

n1:  $C_1=2.399964$  $C_2=-8.308636E-2$  $C_3=-1.919569E-1$
$C_4=8.720608E-2$ $C_5=-1.666411E-2$ $C_6=1.169519E-3$
f1=∞(object surface) d1=1.6667
f2=1.6667 d2=5.4525 n1
f3=2 d3=2
f4=∞(image plane)
Aperture angle on the object side (half angle)=0.012 rad
Aperture angle on the image side (half angle)=0.01 rad
Lateral magnification=−1.2

While the embodiment has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-005818 filed Jan. 14, 2011, which is hereby incorporated by reference herein in its entirety.

What is claimed is:

1. An optical writing head comprising:
   a light emitting element array in which a plurality of light emitting elements is arranged; and
   an optical system configured to concentrate luminous flux radiated from the light emitting element to a predetermined image plane,
   wherein the optical system satisfies a conditional expression $$\Delta_{sk} > \frac{\lambda_0}{2} \frac{1}{NA(\lambda_0)^2}$$

where $\lambda_0$ is a wavelength at which luminous flux radiated from the light emitting element has a peak light intensity, $\Delta_{sk}$ is axial chromatic aberration of at least one of wavelengths having a light intensity approximately 0.81 times the peak light intensity, and NA is the numerical aperture of the optical system on the image side,
   wherein the optical system comprises a diffractive optical element, and
   wherein the diffractive optical element satisfies a conditional expression $\phi_1=(\lambda_1/\lambda_0)\times\phi_0$ where $\lambda_1$ is the at least one of wavelengths having a light intensity approximately 0.81 times the peak light intensity, $\phi_1$ is a power of the diffractive optical element at the wavelength $\lambda_1$, and $\phi_0$ is a power of the diffractive optical element at an wavelength $\lambda_0$.

2. The optical writing head according to claim 1, wherein the optical system comprises a plurality of diffractive optical elements.

3. The optical writing head according to claim 1, wherein the optical system is telecentric on the image side.

4. The optical writing head according to claim 1, wherein the absolute value of the lateral magnification in the optical system is greater than 1.

5. The optical writing head according to claim 1, wherein the emission angle of the luminous flux radiated from the light emitting element is equal to the aperture angle of the optical system on an object side.

6. An image forming apparatus comprising the optical writing head according to claim 1 and a photosensitive portion which the optical writing head irradiates with light to form a latent image.

7. The optical writing head according to claim 1, wherein the optical system is telecentric on an object side.

8. The optical writing head according to claim 1, wherein light emission spectrum of the light emitting element has only one peak light intensity.

9. The optical writing head according to claim 1, wherein the wavelengths having a light intensity approximately 0.81 times the peak light intensity are a wavelength $\lambda_1$ shorter than $\lambda_0$ and a wavelength $\lambda_2$ longer than $\lambda_0$, and the optical system satisfies the conditional expression at $\lambda_1$ and $\lambda_2$.

10. The optical writing head according to claim 1, wherein the optical system is an inverted magnifying optical system.

11. The optical writing head according to claim 1, wherein the optical system is an inverted reducing optical system.

* * * * *